(12) United States Patent
Fan

(10) Patent No.: US 9,194,468 B1
Fan
(45) Date of Patent: Nov. 24, 2015

(54) SLIDER-CRANK MECHANISM WITH L-SHAPED CONNECTING ROD

(71) Applicant: Peter Fan, Saddle River, NJ (US)

(72) Inventor: Peter Fan, Saddle River, NJ (US)

( * ) Notice: Subject to any disclaimer, the term of this patent is extended or adjusted under 35 U.S.C. 154(b) by 0 days.

(21) Appl. No.: 14/502,019

(22) Filed: Sep. 30, 2014

(51) Int. Cl.
*F16H 21/28* (2006.01)

(52) U.S. Cl.
CPC .................................... *F16H 21/28* (2013.01)

(58) Field of Classification Search
CPC ............. F02D 41/0025; F16H 21/16–21/32; F16H 21/38; F16D 41/0025; F16C 3/22; F16C 3/30
USPC ............ 74/23–25, 36, 38–49, 54; 123/197.1, 123/197.3, 197.4
See application file for complete search history.

(56) References Cited

U.S. PATENT DOCUMENTS

| | | | | |
|---|---|---|---|---|
| 584,408 | A * | 6/1897 | Sandell | F16H 21/38 |
| | | | | 112/284 |
| 2,858,702 | A * | 11/1958 | Schneider | 74/36 |
| 4,173,903 | A * | 11/1979 | Papke et al. | 74/47 |
| 4,708,106 | A * | 11/1987 | Giocastro et al. | 123/197.4 |
| 5,762,480 | A * | 6/1998 | Adahan | 417/415 |
| 2007/0295122 | A1 * | 12/2007 | Garavello | 74/44 |
| 2009/0217891 | A1 * | 9/2009 | Alexander et al. | 123/66 |
| 2012/0180752 | A1 * | 7/2012 | Heimanns | 123/197.3 |

\* cited by examiner

*Primary Examiner* — William Kelleher
*Assistant Examiner* — Thomas Magnuson

(57) ABSTRACT

This invention is a device and method for avoiding dead centers in an in-line slider-crank mechanism when it is used to convert linear to rotary motion. The usual straight connecting rod is replaced by an L-shaped connecting rod operating in conjunction with two deflecting pillars. The side-arm of the L-shaped connecting rod travels between the two pillars which are strategically sized and placed, and intended to deflect the side-arm. As a consequence, the crankpin end of the connecting rod is automatically deflected away from the dead center positions, thus avoiding them, and enabling the rotation to become continuous and un-interrupted.

3 Claims, 7 Drawing Sheets

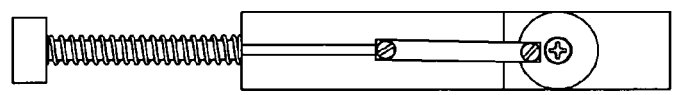
Fig. 2         PRIOR ART
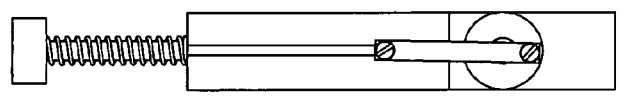
Fig. 3         PRIOR ART

US 9,194,468 B1

SLIDER-CRANK MECHANISM WITH L-SHAPED CONNECTING ROD

CROSS REFERENCE TO RELATED APPLICATIONS

None.

FIELD OF INVENTION

The field of this invention relates to the problem of dead centers in a slider-crank mechanism when it is used to convert linear to rotary motion, and to methods of avoiding them.

BACKGROUND

The crank-slider mechanism is an ancient and proven method for converting rotary to linear motion, in which the crank can be turned repeatedly and continuously as there are no dead centers. The resulting linear motion is however reciprocal, as in the reciprocating piston pump.

When the same mechanism is used in reverse to convert linear to rotary motion, it is however interrupted by dead centers, which limit the rotation to 180 degrees. FIG. 1 shows the names of the principal parts in a slider-crank mechanism, as shown in the Encyclopedia Britannica. FIG. 2 and FIG. 3 show a slider-crank mechanism with the usual straight connecting rod, showing the dead center positions at 3 o'clock and 9 o'clock.

Historically the problem of dead centers has been adequately solved in industrial applications, including for example the use of accessory or secondary rods in the steam locomotive, or the use of the momentum generated by the fly-wheel effect, or the use of multiple slider-crank mechanisms with each rod working on a different phase of the rotation. However the use of these methods inevitably makes the overall apparatus larger and more complicated, and therefore not suitable for miniature use.

For miniature use a slider-crank mechanism needs to have a simpler method of avoiding dead centers, which is currently lacking. Any slider-crank mechanism for converting linear to rotary motion, unhampered by dead centers would find uses in hand instruments, gadgets, or robots, or in any situation where size and space are limited. The only limiting factor would then be the diameter of the rotating element, but not the length of the slide nor the push rod.

SUMMARY

This invention is a device and a method of avoiding dead centers in an in-line slider-crank mechanism, used to convert linear to rotary motion, utilizing an L-shaped connecting rod with two deflecting pillars, with the short side-arm of the L-shaped connecting rod travelling between the two pillars, with the leading edge of the short side-arm being forced to encounter the approaching pillar, a fraction of a millimeter just before it has reached its maximum travel distance, resulting in the crank-pin at the other end of the connecting rod, deflecting away from the dead center position, without the use of any other secondary mechanism, and with the deflection occurring just prior to the termination of the linear motion, and occurring without stoppage, as an integral part of the linear motion. When the L-shaped connecting rod with the two pillars are combined with the use of a compression spring, a linear motion caused by a push on a rod will result in a smooth and complete rotation of the rotary element. This summary is not intended to identify key inventive concepts of the claimed subject matter, nor is it intended for determining the scope of the subject matter.

BRIEF DESCRIPTION OF THE DRAWINGS

There are 7 drawing sheets and 13 figures. The figures are example constructions and are not meant to limit the scope of the invention.

FIG. 2 is a diagram showing the present device with a straight connecting rod, in a horizontal position, with the top dead center position at 9 o'clock.

FIG. 3 is a diagram showing the present device with a straight connecting rod, with the bottom dead center position at 3 o'clock. Note that if the entire apparatus were placed in a vertical position, the dead centers would be at 12 o'clock and 6 o'clock.

DETAILED DESCRIPTION OF THE INVENTION

The purpose of the present invention is to avoid dead centers in a slider-crank mechanism when it is used to convert linear to rotary motion.

Figure 1:
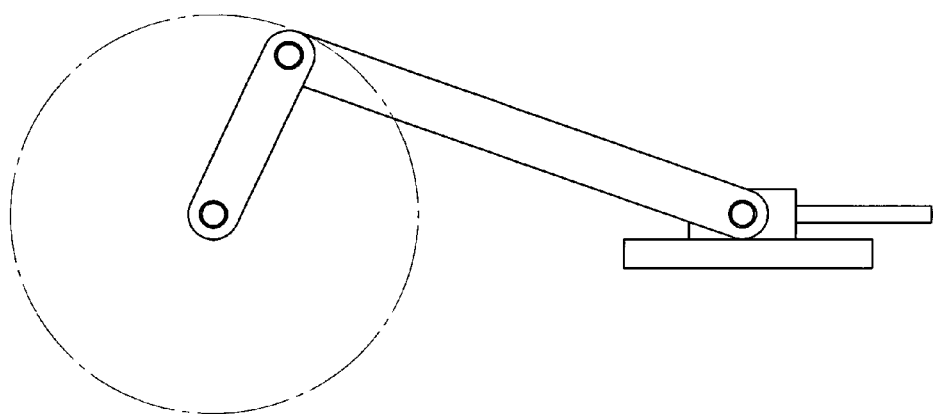
FIG. 1 is a diagram of a slider-crank mechanism, showing the different parts, as shown in the Encyclopedia Britannica. It is provided merely for the purpose of explanation.
The numerical annotations refer to the technical names of the various parts:
1 represents the crankshaft, 2 is the crank, 3 is the crankpin, 4 is the connecting rod which is straight, 5 is the wristpin, 6 is the slider, 7 is the piston rod or plunger, 8 is the sliding platform, and 9 refers to the circle of rotation of the crankpin 3.

Referring to the drawings, the main body of the present device is the sliding platform 8, shown in FIG. 1. Various views of the sliding platform are shown in FIGS. 8, 9, 10 and 11, and it is physically about the size of a small finger. A thin slice of its upper surface 101, is recessed, so that after the rotating disc 2 is mounted, the upper surface of the disc 2 will be level with the upper surface of the platform 121. The external shape of the main body bearing the platform is rectangular, but this is for purposes of demonstration, and could be of any other shape such as semi-cylindrical.

The rotating disc 2 presents with a central hole 109, for mounting of the shoulder screw 1, to be inserted into the threaded hole 104 on the recessed portion of the platform. The head of the shoulder screw 1 will be recessed in the counterbore 112 on the disc 2. The rotating disc 2 also presents with a peripheral hole 108, to receive the smaller shoulder screw 3, for mounting the hole 107 at the straight end of the L-shaped connecting rod 4, hereafter referred to as the L-rod. The rotating disc as shown is for purpose of demonstration, and could be substituted with a spur gear or any circular object.

The L-rod is thin, flat and narrow, with a hole at each end, 106 and 107. Its flat under-surface slides on the upper surface 111 of the platform 8. The sliding end of the L-rod bears a short side-arm 105, which is positioned between the deflecting pillars, 10 and 11. The side-arm of the L-rod as shown has straight edges, but these edges could be of any shape.

A small shoulder screw 5 goes through the hole 106 on the L-rod 4, to join the threaded hole 110 on the tip of the plunger 6. The screw 5 acts as the wristpin in FIG. 1, and slides in the track 103. The plunger 7 acts as a push-rod for the L-rod 4, and slides in and out of the tunnel 102.

The compression spring 12 is mounted on the shaft of the plunger 7, and is held in place by the button 9, which is mounted on to the outer end of the plunger 7. The pushing action is provided externally by the thumb or finger, and the return or pull action is provided by the compression spring.

Applying the concepts in FIG. 1 to FIG. 13, the shoulder screw 1 acts as the crankshaft; the body of the rotating disc 2 acts as the crank; the small shoulder screw 3 acts as the crankpin; the straight part of the L-rod 4 acts the connecting rod; the shoulder screw 5 acts as the wristpin; the inner tip of the plunger 6 acts as the slider; the body of the plunger 7 acts as the push rod; the body of the main piece acts as the sliding platform 8.

Figure 4:
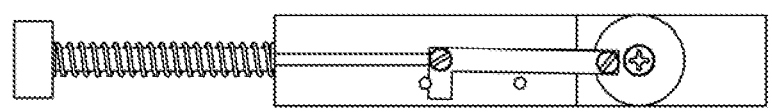
FIG. 4 is a diagram showing the present device with an L-shaped connecting rod with the short side-arm of the connecting rod just touching the pillar on the left side, just before deflection.
Figure 5:
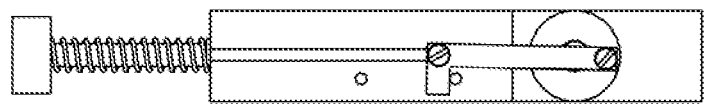
FIG. 5 is a diagram showing the present device with an L-shaped connecting rod with the short side-arm of the connecting rod just touching the pillar on the right side, just before deflection.

The device described here presents two features, believed to be distinctive. First, the connecting rod instead of being usually straight, is L-shaped, as shown in FIG. 4 and FIG. 5. A short side-arm 105 is added to the sliding end of the connecting rod. Second, two deflection pillars 10 and 11, are strategically placed in the path of travel of the side-arm, with one at each end, located just before each leading edge of the side arm reaches the end of its travel.

Figure 6:
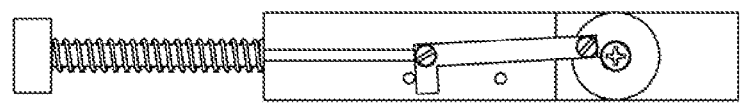
FIG. 6 is a diagram showing the deflection of the crankpin from 9 'clock to 10 o'clock, after maximum force is exerted on the plunger, in this case automatically by the compression spring.
Figure 7:
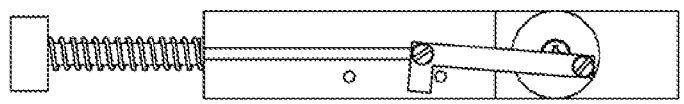
FIG. 7 is a diagram showing the deflection of the crankpin from 3 'clock to 4 o'clock, after maximum push is exerted externally on the plunger, by the thumb or finger.
Figure 8:
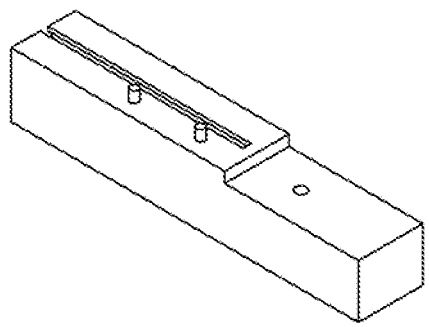
FIG. 8 is a perspective view of the sliding platform, showing the sliding track, the positions of the two deflecting pillars, and the recessed area for accommodating the rotating disc.
Figure 9:
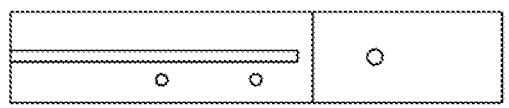
FIG. 9 is a top view of the sliding platform showing the position of the 2 pillars.
Figure 10:
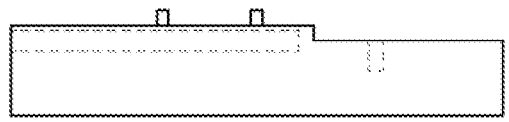
FIG. 10 is a side view of the sliding platform showing the position of the 2 pillars.
Figure 11:
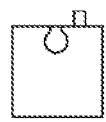
FIG. 11 is a view of the end of the platform where the plunger enters the tunnel, showing the sliding track just above the tunnel and communicating with it, also showing a view of the nearest pillar.
Figure 12:
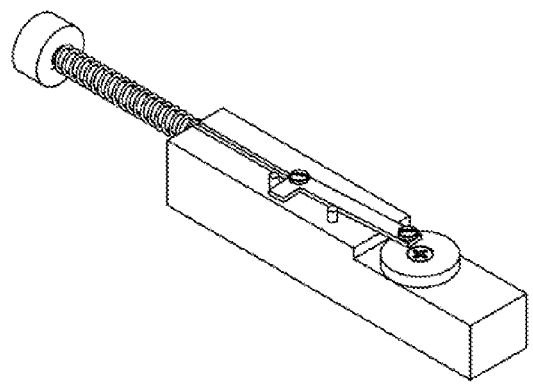
FIG. 12 is a perspective 3D view of the entire assembled device.
Figure 13:
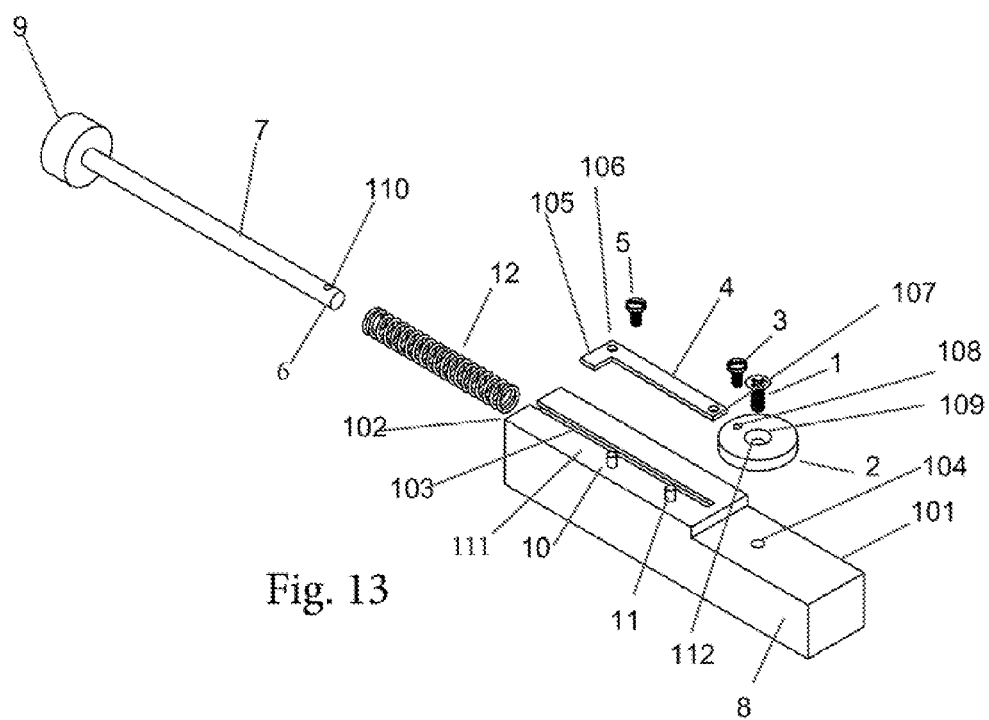
FIG. 13 is a perspective 3D exploded view of the device, with numerical annotations for the parts and features.

With this configuration, as in FIGS. 4 and 5, the side-arm travels between the two pillars. The width of the side-arm, the size and locations of the pillars are inter-related, are crucial, and must be accurately determined. In either direction of travel, the leading edge of the side-arm 105 is arranged to make contact with the appropriate pillar a fraction of a millimeter, just short of its full travel, forcing the crankpin end of the connecting rod to instantly deflect off the dead center positions, as shown in FIG. 6 and FIG. 7.

Determination of the exact size and exact locations of the pillars requires patience and effort. There is no easy formula on account of numerous factors in play. The simplest practical method is first to assemble all the parts except the pillars, and leave them to last. Then with the crank-pin end of the L-rod placed in the top dead center position, mark the position of the leading edge of the side-arm 105 on the platform 1. Repeat the same for the bottom dead center position, but note the opposite edge of the side-arm now becomes the leading edge. Then using the markings as a guide, and knowing the outside diameter of the pillars to be used, determine the center positions of insertion of the pillars on to the platform, in the manner described above, so the resulting interference by either pillar is minimal and just enough to cause a deflection, but not too much interference as to prevent the full range of motion of the push or pull. The pillars must of course have a round outer surface, and must not be installed out of reach for the side-arm How this device works is explained below. For the purpose of illustration, assume that the slider-crank device is in a horizontal position as shown the drawings, and is facing the reader with the slider on the reader's left side, and the rotating disc on the reader's right side, as in FIGS. 4 and 5. The top dead center will be at 9 o'clock on the disc, and the bottom dead center will be at 3 o'clock. In the present device with the L-rod, at the end of the push stroke, the crankpin will be forced to rest at the 4 o'clock position instead of the usual 3 o'clock, as in FIG. 7. At the end of the pull or reverse stroke, the crankpin will be forced to rest at 10 o'clock instead of the usual 9 o'clock position, as in FIG. 6.

Just before the very end of either direction of travel, with either a push or a pull, the side-arm is forced to encounter the pillar. At this point, further continuation of the pull or push to the maximum, will cause the side-arm to rotate around the pillar, resulting in deflection of the crankpin end of the connecting rod from the dead center positions of 9 o'clock and 3 o'clock. Consequently, At the end of the push stroke, the crankpin will rest at 4 o'clock, as in FIG. 7, and at the end of the pull stroke, the crankpin will rest at 10 o'clock, as in FIG. 6. In either position, it is automatically ready for the next stroke or the next reverse stroke.

In this device, the push is performed manually by the thumb or finger on the button 6, and the pull or return is performed by the compression spring 5, but this could be reversed.

The deflection is always in one direction. In this case it is clockwise, and the rotation is always clockwise, in the same direction. Reversing the direction of deflection or rotation is not possible with the present design, but is possible if the location of the side-arm and the pillars are both reversed to the opposite side of the connecting rod. It is however possible to have side-arms and pillars on both sides of the connecting rod, but with one side operating at a time, to be able to reverse the direction of rotation of the disc at will.

The simplicity of the L-shaped connecting rod allows any device using it to be made small and disposable, or placed inside a tube by rendering the external shape of the said platform semi-cylindrical, or placed at the tip of an elongated cannula, or incorporated in a larger body of any description for any purpose, such as a robot or a hand operated instrument, avoiding the use of complicated methods, or the use of electricity, cables or batteries, in converting linear motion to rotary motion.

I claim:

1. A device for avoiding dead centers in a slider-crank mechanism when the slider-crank mechanism is used for converting linear motion to rotary motion, comprising: an input, an L-shaped connecting rod, said L-shaped connecting rod having a wrist pin end connected to said input, and a crank-pin end, said L-shaped connecting rod having a side-arm attached to the wrist pin end of said connecting rod, the device further comprising two deflection pillars which make contact with the side-arm of the connecting rod to deflect the crank pin end of the said connecting rod off the dead center positions.

2. The device of claim 1, wherein said input further comprises a compression spring, thereby enabling continuous rotation of a rotary element with repeated pushing or pulling.

3. A method of avoiding dead centers in a slider crank mechanism used for converting linear to rotary motion using the apparatus of claim 1, said method comprising: imparting a linear motion to said input until said side-arm of said connecting rod makes contact with said deflection pillars, thereby allowing said crank pin end of said rod to deflect away from said dead center positions.

* * * * *